(No Model.) 2 Sheets—Sheet 1.
J. LOGAN.
DEVICE FOR ASCERTAINING THE EXPANSIBILITY AND CONTRACTIBILITY OF BALANCE WHEELS FOR WATCHES.
No. 392,442. Patented Nov. 6, 1888.
Fig.1.
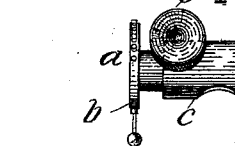
Fig.2.
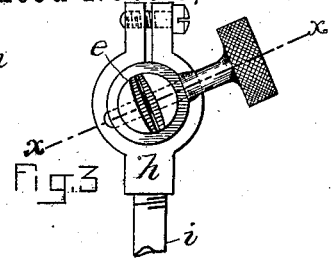
Fig.3.
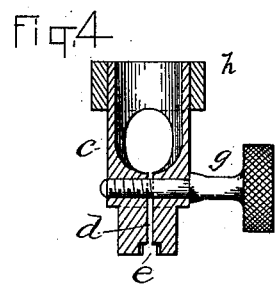
Fig.4.
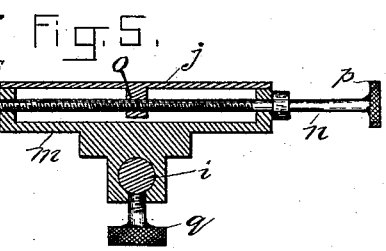
Fig.5.
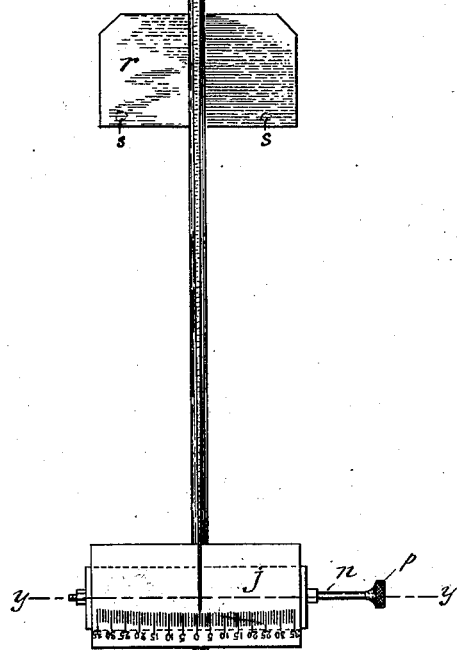
WITNESSES:
A. D. Harrison
W. B. Ramsay
INVENTOR:
John Logan.
By his Attys.
Wright, Brown & Crossley.

(No Model.) 2 Sheets—Sheet 2.
J. LOGAN.
DEVICE FOR ASCERTAINING THE EXPANSIBILITY AND CONTRACTIBILITY OF BALANCE WHEELS FOR WATCHES.
No. 392,442. Patented Nov. 6, 1888.
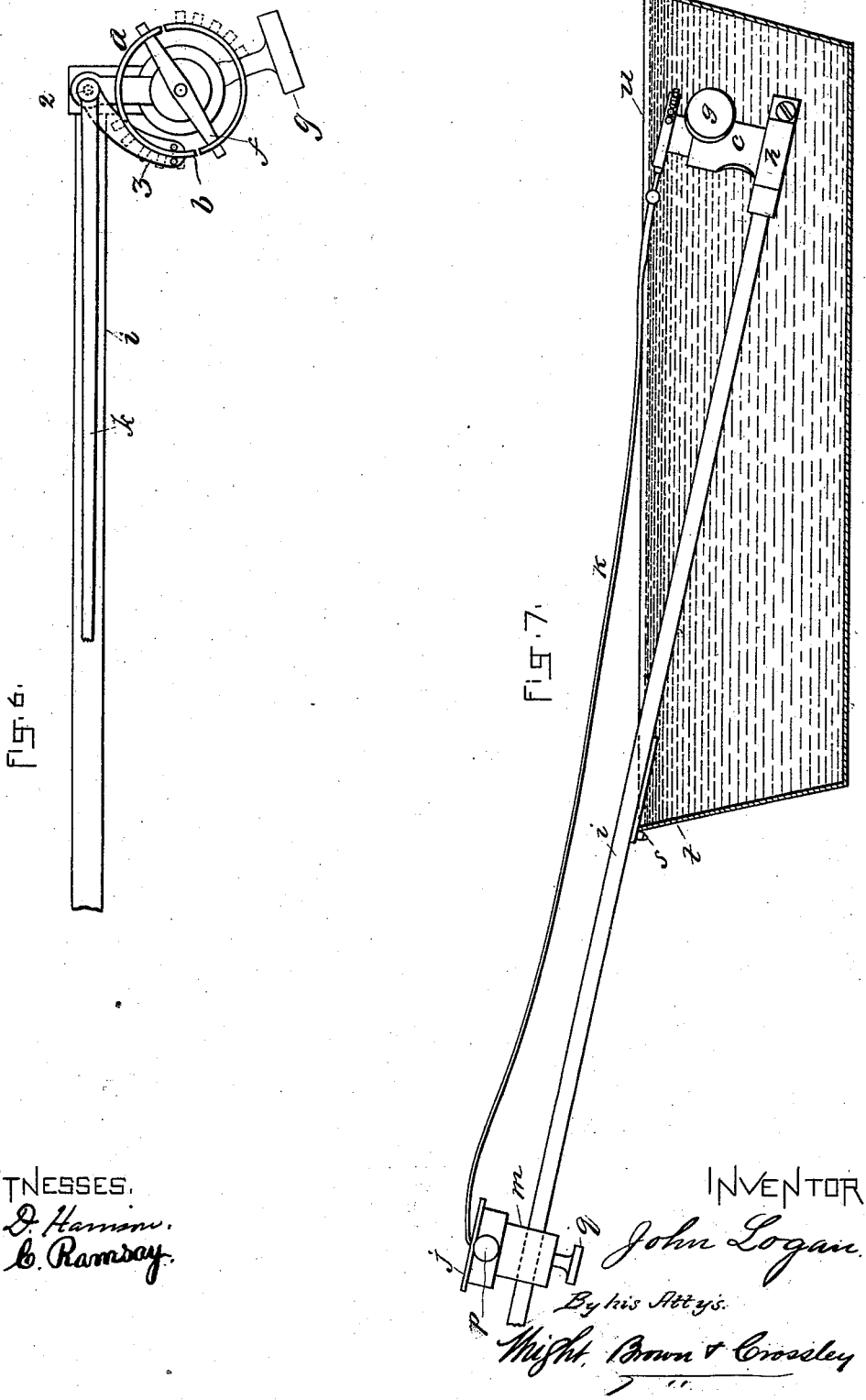

UNITED STATES PATENT OFFICE.

JOHN LOGAN, OF WALTHAM, MASSACHUSETTS.

DEVICE FOR ASCERTAINING THE EXPANSIBILITY AND CONTRACTIBILITY OF BALANCE-WHEELS FOR WATCHES.

SPECIFICATION forming part of Letters Patent No. 392,442, dated November 6, 1888.

Application filed February 23, 1888. Serial No. 264,986. (No model.)

*To all whom it may concern:*

Be it known that I, JOHN LOGAN, of Waltham, in the county of Middlesex and State of Massachusetts, have invented certain new and useful Improvements in Devices for Ascertaining the Expansibility and Contractibility of Balance-Wheels for Watches, of which the following is a specification.

In the construction of balance-wheels for chronometers and the better grades of watches it is necessary, in order to secure accuracy of movement, to provide means for compensating for the disturbing influence of varying degrees of temperature to which they may be exposed, the effect of heat being to increase the length of the hair-spring and to weaken its elastic force, and the opposite result of course being the effect of cold.

To provide means whereby the needful compensation aforesaid shall be automatically performed, it is customary to construct the rim of the balance of two metals, the outer portion of which shall possess the quality of high expansion under the influence of heat. The balance being constructed with two arms to support the rim and the rim being severed at opposite sides and at points adjacent to the supporting-arms, the rim is thus formed in two sections, each of which is supported at one end only, leaving the other end free to yield and move from its normal position in either direction as they are subjected to the influence of heat or cold. It will be readily seen that the point of greatest movement will be at the free end of each section of the rim, and that if the extent of movement of this free end of the rim from its normal position can be measured or determined then the relative expansive qualities of different balances can be ascertained and the corresponding requirements of the hair-spring determined.

The aim and object of my invention are to provide a device or improved means for readily measuring the amount of expansion of watch or chronometer balances; and the invention in the present case consists of the devices which I will now proceed to describe and claim, reference being had to the accompany drawings, and to the letters of reference marked thereon, forming a part of this specification, of which drawings—

Figure 1 is a top plan view of my contrivance for measuring the expansibility and contractibility of balance-wheels for chronometers and watches in one of the forms in which I have found it convenient to employ it, the pointer being attached to one of the free ends of the rim and extending directly outward therefrom, a part of the handle or support being pictured as broken out. Fig. 2 is a side elevation of the device shown in Fig. 1. Fig. 3 is a top plan view of the balance-wheel support or clamp. Fig. 4 is a sectional detail view taken on the line $xx$ of Fig. 3. Fig. 5 is a sectional detail taken on the line $yy$ of Fig. 1. Fig. 6 is a detail view showing a modified manner of supporting the pointer and connecting it with one of the free ends of the rim of the balance-wheel. Fig. 7 is a detail view showing the manner of immersing the holder and balance in water contained in a basin or vessel.

Like letters of reference designate like parts in all of the views.

In carrying out my invention I provide suitable means for holding the balance-wheel $a$ in fixed position, so that its rim $b$ shall be free to expand and contract as it may be affected by heat and cold. The means employed for this purpose may be variously constructed. That here shown as employed for this purpose consists of a standard or post, $c$, split at its upper end, as at $d$, and provided in its upper end or face with a groove or channel, $e$, adapted to receive the cross-arm $f$ of the balance-wheel and to pinch and hold said cross-arm between the split portions of the post by means of the thumb-screw $g$, passing loosely through one of the slit portions and screw-tapped into the other, as shown most clearly in Fig. 4, where the balance-wheel-holding post is portrayed in inverted position.

The lower end of the post $c$ is detachably secured in a clamp-collar, $h$, to which one end of a handle or rod, $i$, is secured in any suitable manner, a graduated indicating scale or plate, $j$, being adjustably attached to said handle or rod toward the opposite end thereof.

$k$ designates a finger or pointer, preferably composed of aluminum or other light metal, though it may be composed of any suitable material, which pointer is attached at one end to or near to one of the free ends of the divided rim of the balance-wheel and has its other end extended out to or over the graduated plate or scale *j*, so that if the balance-wheel should be plunged or immersed in cool or ice-cold water the contraction of the rim *b* would move the free end of the pointer *k* in one direction on the graduated plate or scale, and if the balance-wheel should then be immersed in hot or boiling water the expansion of the rim would move the free end of the pointer in the opposite direction and the degree of contraction and expansion of the rim accurately ascertained, so that balances which have not a sufficient expansibility and contractibility can be rejected.

I have mentioned the plunging of the balance-wheel fixed upon its support first in ice-cold water and then in boiling water; but these two acts may be performed in reverse order, or other liquids may be used in place of water, or other temperatures than ice-cold and boiling water, or the wheel subjected to varying temperatures in other ways with the same result as that described. I have found it most expedient, however, to employ water, since water under the conditions mentioned is at fixed degrees of temperature and may be readily employed.

Though it is not essential, I prefer to make the scale or graduated plate *j* adjustable laterally as well as longitudinally with respect to pointer *k*, so that when, say, the balance-wheel is immersed in ice-cold water or liquid of a certain temperature (ascertainable with a thermometer) the dial or plate may be adjusted so that the pointer *k* will be at or point to zero, (0,) and when the balance-wheel is immersed in boiling water or hot liquid of a certain temperature the pointer will move from zero outward therefrom and show at a glance and without computation the degree of contraction or expansion under the two degrees of temperature. This lateral adjustability of plate *j* is here shown as accomplished by arranging said plate on its support *m* so as that it may slide thereon, arranging a rod, *n*, so as to turn in bearing formed in the support *m*, but so as not to move longitudinally therein. Rod *n* is given a screw-thread connection with plate *j*. (Here shown as through the medium of a lug, *o*, formed on the lower side of the plate.) When, now, rod *n* is revolved, which may be accomplished by means of a thumb-knob, *p*, on the end thereof, plate *j* will be moved on its support *m*, as described. The construction and operation just set forth will be clearly understood by reference to Fig. 5 of the drawings.

*q* designates a thumb-screw, by means of which the support *m* may be adjusted longitudinally on rod *i*.

*r* designates a plate attached to the rod *i*, which may be employed to assist in maintaining the parts in proper position horizontally, and this may be done by resting said plate on the edge of the vessel containing the water or other fluid in which the balance-wheel may be immersed, lugs *s* on the lower face of plate *r* serving to engage the side of the rim *t* of the vessel *u*, thus affording a rest for the plate *r*, which will prevent it from slipping forward off the rim into the vessel.

In Fig. 6 I have shown the pointer *k* as pivoted at its end adjacent to the balance-wheel-supporting means to the support for said means, as at 2, and as provided with a short angular arm, 3, the free end of which engages one of the free ends of the divided rim of the balance-wheel, so that as said rim contracts and expands the pointer *k* will be moved on its pivot 2, and the free end of said pointer moved over the graduated plate or scale, with the result before explained.

Though I have been particular to describe all of the parts of my improvement as shown in the drawings, it is obvious that said parts may be varied in form and arrangement without departing from the nature or spirit of the invention hereinbefore and hereinafter set out.

The operation of my improved device will be readily understood. A balance-wheel being fixed in position on the post *c*, one end of the pointer *k* may be attached thereto by passing said end into or through one of the holes formed in the rim, or otherwise securing it thereto, the other end extending out over the graduated plate or scale *j*, so that the balance-wheel can be at once immersed in cold water or other liquid and the plate *j* adjusted as explained, when said balance-wheel can be taken out of the cold water and subjected to hot or immersed in ice-cold water, and the degree of expansion and contraction of the rim thus ascertained with the greatest accuracy.

I claim—

1. A device for ascertaining the expansibility and contractibility of balance-wheels for watches, consisting of a support for the balance-wheel, a clamp connected with said support for holding the balance-wheel in fixed position, a graduated scale, and a pointer attached at one end to the rim of the balance-wheel and having the other end extended to or over the scale, as set forth.

2. A device for ascertaining the expansibility and contractibility of balance-wheels for watches, consisting of a support for the balance-wheel, a clamp connected with said support for holding the balance-wheel in fixed position, a graduated scale, a rod or bar connecting the support for the balance-wheel with the scale, and a pointer attached at one end of the rim of the fixed balance-wheel, and having the other end extended to or over the scale, as set forth.

3. A device for ascertaining the expansibility and contractibility of balance-wheels for watches, consisting of a clamp and support for clamping and holding the cross-arm of a balance-wheel in fixed position, a graduated scale, and a pointer attached at one end to the rim of the balance-wheel and having the other end extended to or over the scale, as set forth.

4. A device for ascertaining the expansibility and contractibility of balance-wheels for watches, consisting of a support for the balance-wheel, a clamp connected with said support for holding the balance-wheel in fixed position, a graduated scale, and a pointer attached at one end to the rim of the fixed balance-wheel and having the other end extended to or over the scale, the said scale being adjustable laterally with respect to the pointer, as set forth.

5. A device for ascertaining the expansibility and contractibility of balance-wheels for watches, consisting of a support for the balance-wheel, a graduated scale, a rod or bar connecting the support for the balance-wheel with the scale, a supporting-plate on said rod or bar intermediate of the scale and the support for the balance-wheel, and a pointer attached at one end to the rim of the balance-wheel and having the other end extended to or over the scale, as set forth.

In testimony whereof I have signed my name to this specification, in the presence of two subscribing witnesses, this 14th day of February, A. D. 1888.

JOHN LOGAN.

Witnesses:
C. F. BROWN,
E. A. MARSH.